United States Patent [19]

Mead

[11] 4,442,513

[45] Apr. 10, 1984

[54] SONAR TRANSCEIVER SYSTEM AND METHOD

[75] Inventor: Ronald C. Mead, Van Nuys, Calif.

[73] Assignee: The Bendix Corporation, Southfield, Mich.

[21] Appl. No.: 345,987

[22] Filed: Feb. 5, 1982

[51] Int. Cl.³ .................. G01S 15/14; G01S 7/66
[52] U.S. Cl. .................................. 367/100; 343/14; 364/728; 367/101
[58] Field of Search .............. 367/100, 101; 343/14, 343/17.2 R; 364/728

[56] References Cited

U.S. PATENT DOCUMENTS

| 3,363,248 | 1/1968 | Nicodemus | 343/17.2 |
| 3,887,918 | 6/1975 | Bailey, Jr. et al. | 343/17.2 |
| 4,199,246 | 4/1980 | Muggli | 354/195 |
| 4,255,795 | 3/1981 | Hechtenberg | 364/728 |
| 4,287,528 | 9/1981 | Heyser | 367/88 |
| 4,404,665 | 9/1983 | van Heyningen | 367/100 |

Primary Examiner—Richard A. Farley

Attorney, Agent, or Firm—Robert C. Smith; W. F. Thornton

[57] ABSTRACT

A sonar transceiver system and method includes an oscillator and programmable divider which are arranged to cause a transmitting transducer to transmit a plurality of four consecutive closely spaced tones in the manner of a pseudo-chirp. The receiver includes hard limiting means for converting received echo signals to binary signals and tone correlation and detection means including a shift register which compares samples of the binary received signal with a sample of a sine wave as hard limited which is carried on a storage register. A series of exclusive-OR comparator circuits effect the comparison and produce output signals of a desired magnitude when correlations are found. Switching means responsive to detection of the first of the transmitted tones causes the programming means to vary the divisors of the programmable divider to produce clock pulses of varying frequency to the shift register for the time and in the order of the transmitted tones.

14 Claims, 1 Drawing Figure

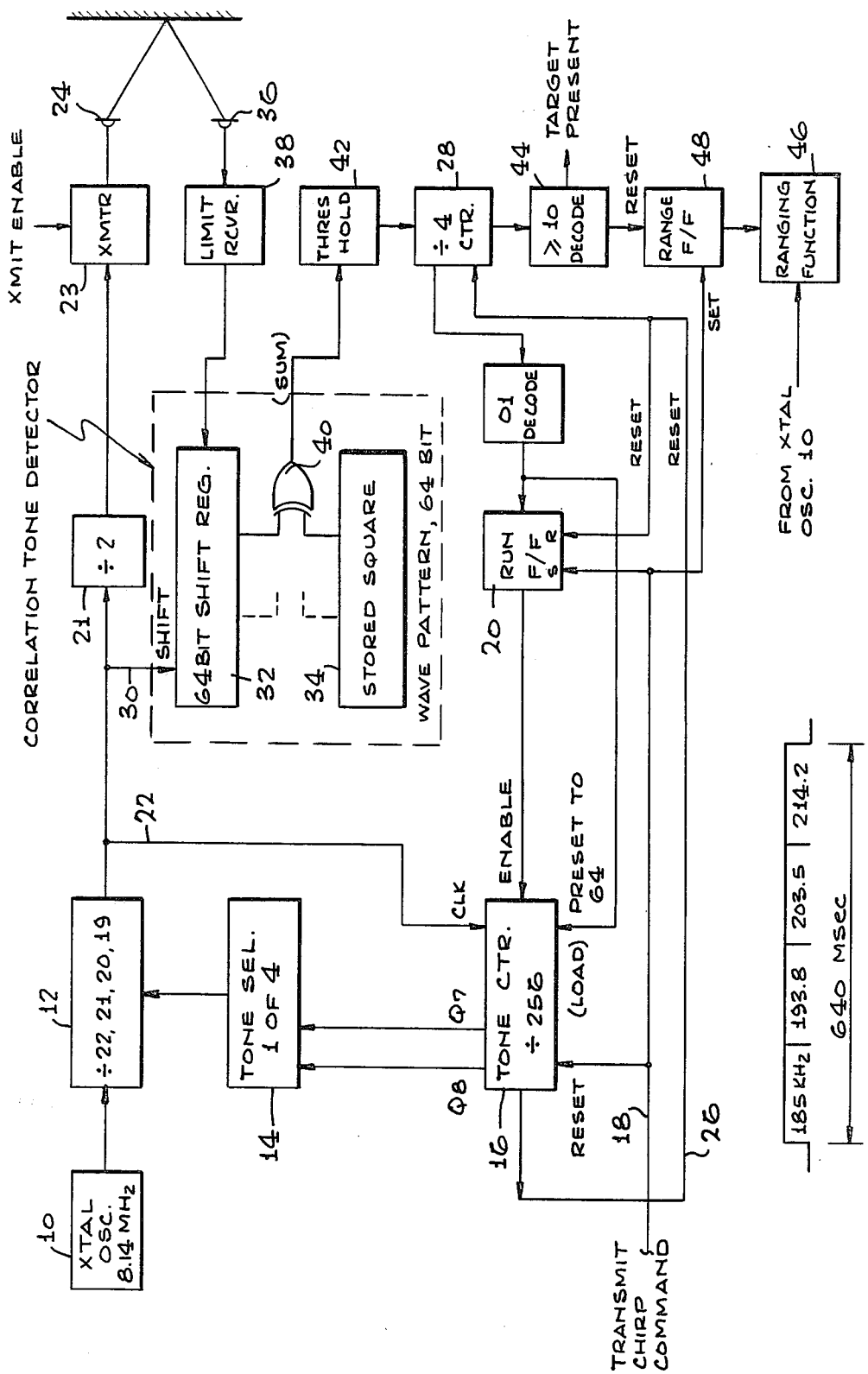

SONAR TRANSCEIVER SYSTEM AND METHOD

The present invention relates to a sonar system and method of processing sonar signals using chirp-like pulses.

Sonar transceivers of the type described herein include means for generating chirp-like electrical signals which are supplied to underwater transducer means which converts the electrical signals to acoustic transmitted signals. A receiver receives any echo signals from said transducer means and includes a correlation structure for correlating the received signals with the transmitted signals and which responds to a recognized correlation by producing an output.

It is well known in both radar and sonar systems that chirp pulses can be used to improve range resolution and to discriminate against clutter and reverberation to thereby improve the signal-to-noise ratio. The U.S. Pat. No. 3,363,248 to Nicodemus discloses a radar receiver using chirp pulses for suppressing second time around echos. In this system alternate pulses are swept up in frequency and down in frequency. U.S. Pat. No. 4,199,246 to Muggli discloses an ultrasonic ranging system for a camera which utilizes a chirp pulse and a filter correlator in the receiver to match pulses so as to isolate frequencies. U.S. Pat. No. 4,287,578 shows a conventional sonar system employing chirp signals and two successive frequencies. Bailey et al U.S. Pat. No. 3,887,918 discloses a radar system having a multilevel coincidence detector which compares the incoming pulses in a delay line with a code stored in any of a plurality of coincidence detectors. Each coincidence detector operates to provide a digital output level based on affirmative comparison of received vs. stored codes. This reference is exemplary of prior art showing the use of a shift register as a correlator.

There have been many arrangements suggested and implemented for improving resolution in sonar systems through the use of various signal conditioning schemes. The use of transmitted chirp signals (linear FM sweep), pseudo-random signals, or groups of pulses, etc., have all been tried with some success. Some schemes have been quite elaborate and correspondingly expensive. There continues to be a need for a sonar system and method which will provide good range resolution and discrimination against clutter and reverberation and which can be implemented simply and comparatively inexpensively. Analog correlation systems have been used with some success but typically involve a substantial amount of computer structure and are expensive to implement.

The sonar signal processing system and method of the invention includes a precision oscillator combined with divider and programming means for generating a plurality of tones, preferably four, which are closely spaced in frequency and which together constitute a chirp-like tone which is transmitted. The echo returns from the chirp-like transmitted signals are hard limited to convert them to a binary form and supplied to a shift register connected to a clock which controls the rate at which samples of the received binary signals are processed through the shift register. The received binary signal samples are compared with stored binary singals and an output signal produced when the received and stored signals reach a desired proportion of agreement. When the initial tone is detected, an output signal is produced which is used to advance the clock to the frequency of the next tone. Subsequently the programming means clocks the signal samples through the shift register at the frequencies and in the order the tones were transmitted. For each correlation detected another such output signal is produced. This series of output signals, each representing the desired agreement with the stored binary pattern at its frequency, is then supplied to a circuit which determines whether the tones have been received in the proper order as transmitted and including a majority test arrangement to determine whether a majority of said tones, as transmitted, are present in the received echo returns.

The invention also comprises a signal processing system for correlating received signals with a transmitted signal through the use of a shift register correlator controlled by a clock having a predetermined varying frequency output to tune the correlator.

An advantage resulting from the invention is that the stored pattern against which the input or received signal is compared need not be changed with changes in the frequency of the clock.

Another advantage resulting from the invention is that the correlation of received signals with transmitted signals is accomplished with simpler, smaller and less expensive digital (LSI) mechanization than where such signals are correlated using the usual analog correlation methods.

The invention will now be described with reference to the accompanying drawings wherein:

The single FIGURE is a block diagram showing a sonar transceiver utilizing my invention.

Referring now to the sole FIGURE, a crystal controlled oscillator 10 having a desired frequency such as 8.14 MHz is connected to a digital programmable divider circuit which is capable of dividing the frequency of the oscillator output by any of a plurality if divisors to produce a plurality of closely spaced tones. For example, divider 12 divides the oscillator 10 output by 22, 21, 20 and 19, thus yielding frequencies of 370 KHz, 387.6 KHz, 407 KHz and 428.4 KHz. The particular frequencies may vary but typically will be separated by approximately five percent. Connected to the divider 12 is a tone selector 14 which includes reset means to select the divided tones in the desired order and which is switched from a tone counter 16 having Q7 and Q8 output lines which carry binary coded information to tone selector 14. At the time the system receives a transit chirp command on a line 18 (which may originate with a repetition rate oscillator set to produce command pulses at a rate such as two per second or ten per second depending upon the expected range of the target), counter 16 is reset to begin counting up from zero toward 255 counts when "run flip-flop" or multivibrator 20 is set to enable counter 16 to receive clock pulses from divider 12 on a line 22. The preset on counter 12 causes it to overflow at every 22 counts and to emit a carry count or pulse which is supplied to the clock input terminal of tone counter 16. This same carry pulse is supplied to a "divide-by-two" circuit 21 which halves the tone frequencies such that frequencies of 185 KHz, 193.8 KHz, 203.5 KHz and 214.2 KHz are generated and amplified by sonar transmitter 23 which drives transducer 24. The carry pulse is also supplied to a 64 bit shift register 32, discussed below.

If counter 16 has received no changed input, the preset to divider 12 will remain the same and divider 12 will therefore continue to produce counts at the divide-by-22 rate (370 KHz) until the tone counter 16 reaches a count of 64 carry pulses from divider 12 (approximately 160 msec.), at which time it will provide a changed binary signal on output lines Q7 and Q8 (such as 0 1) to tone selector 14 which reprograms the divider 12 to begin dividing by 21. This will result in producing an output at 387.6 KHz for approximately another 160 msec. (64 carry pulses) at which time the tone generator produces a binary output (such as 1 0) on lines Q7 and Q8 instructing the tone selector 14 to program divider 12 to begin dividing the oscillator output by 20. This results in producing a tone at 407 KHz for approximately 160 msec. after which the tone counter 16 produces a binary output (such as 1 1) which resets divider 12 to divide by 19, producing a tone at 428.4 KHz. After this tone, the tone counter overflows, producing a 0 0 output which reprograms divider 12 to divide by 22 and which appears on a line 26 and operates to reset the run flip-flop 20 which disables the tone counter and enables a "divide-by-4" counter 28. This terminates the transmitted pulse consisting of the desired four closely spaced tones and initiates the listening or receive mode.

The carry pulses from programmable divider 12 are also supplied as clock pulses along a line 30 to a 64-bit shift register 32. Associated with the shift register 32 is a storage register 34 which stores a square wave pattern 64 bits wide corresponding to the expected pattern of the received echo signal since the transmitted tones are uniform tones (sine waves), the stored pattern is a regular digital signal (1 0 1 0 ... etc.) such as results from hard limiting of a sine wave. Received echo signals appear on a transducer 36 and are supplied to a receiver 38 which hard limits the received signals which are then connected to shift register 32 where samples are clocked through at a rate set by the clock pulses from divider 12. The sum of a plurality of exclusive-OR comparator circuits 40 connected to receive inputs from each stage of shift register 32 and storage register 34 continually compares the bit pattern between the two registers, producing an irregular output which varies in magnitude with the instantaneous correlation between the bit patterns, the output being much greater at the time of substantial correspondence or correlation between the shift register and storage register patterns. This output is connected to a threshold-responsive circuit 42 which produces an output only when the magnitude of the sum output of comparator circuits 40 is large, representing a substantial instantaneous correlation between the bit flow across shift register 32 and the bit pattern stored in storage register 34. This output then appears as a clock input signal to the "divide by four counter 28" which has been carrying a "00" output signal since it was reset at the end of the transmit cycle, and advances counter 28 to an "01" binary output. This change is sensed by the "01 decode" circuit which then again "sets" the run flip-flop 20, enabling the tone counter 16, but presetting it to a count of 64 at the same time so that it will begin counting clock pulses from divider 12 at 64. This causes the tone counter 16 to produce an "0 1" output on lines Q7 and Q8 causing tone selector 14 to program divider 12 to divide by 21, changing the clock rate on the shift register 32 such that it now seeks to correlate with a received frequency of 193.8 KHz, which is the second transmitted tone.

Should such a second tone appear at the receive transducer 36 during the time tone counter 16 is counting from 64 to 127 this will again be sensed by the comparator circuit 40 which will produce through the threshold circuit 42, an output clocking the "divide by 4" counter 28 to produce a new binary output such as "1 0". At count 128, tone counter 16 will automatically produce on lines Q7 and Q8 a "1 0" output, whether or not the second tone was actually received. This, of course, presets the divider 12 to clock shift register 32 to the third tone so that shift register 32 seeks to correlate with a received frequency of 203.5 KHz. Should such a correlation occur, the comparator circuit 40 will produce a large output passing the threshold circuit which will again supply an output signal to "divide-by-4" counter 28 causing its output to switch to "1 1".

A decode circuit 44 is connected to the "divide-by-4" counter 28 such that it counts the correlations found in the received signal. This circuit responds to the receipt of three or more of the transmitted four tones with an input to a display device (not shown) which could be a cathode ray tube display, and which indicates that a target is present.

If it is desired to provide a reading of the range of the target, this may be done by providing a separate counter 46 connected to any suitable high speed oscillator, which may be oscillator 10, and counting the oscillator counts between the initiation of the transmit command and the output of the decode circuit 44. The counting control is supplied by means of a range flip-flop or multivibrator 48 which receives the transmit command on its "set" terminal to thereby cause the oscillator counts to be counted, and which receives the "target present" signal from decode circuit 44 on its reset terminal to cause the counter 46 to stop counting. The count can, of course, readily be converted into range of the target since the oscillator frequency and the speed of sound in water are known.

The length of the shift register used is important in determining the resolution of the tone detector. A minimum number of stages is required to separate two frequencies. The closer the two frequencies are, the longer the shift register must be and the longer the correlation time to separate the frequencies. In this case it has been found that a 64-bit shift register is sufficient to separate frequencies only 5% apart.

A factor which has been found to assist in determining the existence of valid echo returns vs. returns from large grazing angle reflectors such as the ocean bottom and surface is that returns from a point reflector or a surface normal to the transmitter do not experience pulse stretching whereas echos from large grazing angle reflectors are stretched. Therefore the shift register will reject echo returns from such large grazing angle reflectors.

I claim:
1. A sonar transceiver system including transducer means for transmiting and receiving sonar signals in the water, including means for generating chirp-like electrical signals connected to said transducer, means to convert said electrical signals to acoustic transmitted signals and means for receiving echo signals including said transducer means and a correlator for correlating the received signals with the transmitted signals and which responds to a recognized correlation by producing an output signal, characterized in that said system includes:
   (a) means including said transducer means for generating and transmitting sonar signals consisting of a plurality of n ultrasonic tones closely spaced in frequency and consecutive such as to form a pseudo chirp pulse,
   (b) means for receiving and detecting echo signals including said transducer means, and a receiver including hard limiting means for converting said received signals into binary signals, (c) a shift register for receiving said binary signals, (d) clock means connected to said shift register for processing samples of said binary signals through said register for a predetermined number of counts at a rate corresponding to the frequency of the first of said tones, (e) storage means for storing a binary wave pattern corresponding to said transmitted tones as limited, (f) correlation means comprising said received binary signals with said stored pattern and producing an output signal when said shift register binary signal and said stored pattern reach a desired correlation, (g) means responsive to the occurence of said output signal to reset said clock to change the rate of sampling said received binary signals in said shift register to correspond to the frequency of the second of said tones, said correlation means then comparing said received binary signals with said stored pattern and producing a second output signal when said shift register binary signal and said stored pattern reach a desired correlation, (h) means responsive to the completion of the number of counts of said clock means at each of said second and subsequent output signals to the nth output signals for successively resetting said clock to change the rate of processing said binary signals in said shift register to correspond to the frequencies of said second and successive tones to the nth tone, said correlation means producing an output signals each time said shift register binary signal and said stored pattern reach a desired correlation, (i) circuit means determining whether said output signals represent the reception of said tones in the proper order as transmitted, and (j) majority test means responsive to the occurence of a desired majority of said "n" tones and providing an output if said desired majority of tones is present.

2. A system of correlating a series of received acoustic signals with a plurality or uniform closely spaced transmitted tones comprising receiving means for receiving said acoustic signals, converting said acoustic signals to electrical alternating current signals and hard limiting said electrical signals to produce a corresponding series of binary signals:

a shift register connected to said receiving means and a programmable clock for clocking samples of said series of binary signals through said shift register, a storage register storing a pattern of binary signals corresponding to the pattern of a sine wave as hard limited, means programming said clock to produce clock pulses at the frequencies and in the order of said transmitted tones to cause samples of said series of received binary signals to be clocked through said shift register at said frequencies and in the order transmitted, comparator circuit and summing means connected to said shift register and said storage register for continuously comparing the binary signals thereon and for producing an output of a desired magnitude upon the occurrence of a desired correlation between said shift register and said storage register signals.

3. A correlation system as claimed in claim 2 wherein said programming means includes counter means responsive to the sensed reception of the first of said tones to cause said clock frequency to be shifted to the second of said tones for the period equalling the transmission period of said second tone, following which said clock frequency is successfully shifted to the next tone after passage of the period during which each tone was transmitted.

4. A correlation system as claimed in claim 2 wherein a decode circuit is provided which receives an input with each sensed correlation of a received tone with the transmitted tone and which responds to reception of a desired majority of the tones in a transmitted pulse by producing an output signal.

5. A correlation system as claimed in claim 4 including a ranging counter calibrated to reflect counts in terms of distance, a multivibrator connected to start and stop said ranging counter, an oscillator connected to said ranging counter, means responsive to the initiation of a transmit command connected to said multivibrator for causing said multivibrator to begin counting counts of said oscillator and means responsive to receipt of an output signal from said decode circuit connected to said multivibrator for causing said multivibrator to stop counting counts of said oscillator.

6. A correlation system as claimed in claim 3 wherein said programming means includes a high frequency oscillator, a programmable divider connected to receive high frequency signals from said oscillator, a tone selector connected to said programmable divider capable of presetting said divider to divide by any of a plurality of integers, a tone counter connected to said tone selector means and providing binary code signals to said tone counter to vary the divisor of said programmable divider, with said divider providing clock counts to said tone counter and said tone counter responding to a number of clock counts equalling the number of bits in said shift register to change said binary code to change said divisor.

7. A correlation system as claimed in claim 6 wherein said programming means includes means responsive to a transmit command for causing said tone counter to begin counting and to receive clock counts from said programmable divider, said tone counter responding to a full count by producing a desired binary output signal operating to disable said tone counter, to preset said tone selector to the first of said tones and to reset said counter means.

8. A correlation system as claimed in claim 3 wherein said transmitted tones are a series of four tones separated approximately five percent in frequency and transmitted for approximately 160 msec each to constitute a pseudo chirp approximately 640 msec in duration, said shift register and said storage register are sixty-four bits long and said tone counter counts two hundred fifty-six counts.

9. A correlation system as claimed in claim 7 wherein said transmitted tones are a series of four tones separated approximately five percent in frequency and transmitted for approximately 160 msec each to constitute a pseudo chirp approximately 640 msec in duration, said shift register and said storage register are sixty-four bits long and said tone counter counts two hundred fifty-six counts.

10. A system for correlating a series of uniform alternating current signals closely spaced in frequency and consisting of first through nth tones with unknown alternating current signals believed to contain said tones comprising, means hard limiting said unknown alternating current signals to produce a series of binary signals, a shift register including a clock terminal for clocking samples of said binary signals therethrough, a storage register for storing a pattern of binary signals corresponding to the pattern of a sine wave as hard limited, programmable counter means connected to said clock terminal for providing variable frequency clock pulses to said shift register, the frequencies of said clock pulses corresponding to the order of said first through nth tones, comparator circuit and summing means connected to said shift register and said storage register for continuously comparing the binary signals thereon and for producing output signals of a desired magnitude upon the occurence of correlations between said binary signals, 11. A correlation system as claimed in claim 10 wherein majority test means are included connected to receive said output signals and responding to a desired majority of n said signals to provide an output if said desired majority of n tones is present in said unknown alternating current signals.

12. A method of processing sonar signals using chirp-like tones including the steps of:

(a) transmitting a plurality of n ultrasonic tones closely spaced in frequency and consecutive such as to form a pseudo chirp pulse, (b) receiving echo signals including said tones and hard limiting said received signals to produce binary signals representative of said received signals, (c) storing a binary pattern corresponding to a sine wave as hard limited, (d) processing samples of said binary received signals through a shift register at a clock rate corresponding to the frequency of the first of said tones, (e) comparing said received binary signals with said stored binary pattern and producing an output signal when said binary received signals and said binary pattern reach a desired correlation, (f) varying said clock rate in response to said output signal to correspond to the frequency of the second of said tones, repeating step (e) and producing a second output signal if a correlation is found, (g) successively varying said clock rate to correspond to the frequency of the third and subsequent tones up to the nth tone, repeating step (e) each time and producing third and subsequent output signals up to the nth output signal, and (h) testing said output signals to determine if a desired majority of said "n" tones is represented and providing an output if said desired majority of tones is present.

13. A method of correlating a series of one through n closely spaced uniform alternating current tones having an essentially sine wave characteristic and constituting a pseudo-chirp with an unknown alternating current signal, comprising the steps of:

(a) storing on a storage register a binary pattern corresponding to a sine wave as hard limited, (b) hard limiting said unknown alternating current signal to produce a series of binary signals and connecting said signals to a shift register, (c) providing a series of clock pulses corresponding to the frequency of the first of said tones and clocking samples of said series of binary signals through said shift register at said frequency, (d) continually comparing said series of binary signals with said binary pattern and producing an output signal when said signals reach a desired correlation, (e) responding to said output signal to change the frequency of said clock pulses to that of the second of said tones and continuing said clock frequency for the period of the second of said tones, while repeating step (d) and producing a second output signal if a correlation is found, (f) responding to completion of the period of the second of said tones to change the frequency of said clock pulses to that of the third tone, again repeating step (d) and producing a third output signal if a correlation is found, (g) continuing to change the frequency of said clock pulses to that of said subsequent tones to said nth tone, each time repeating step (d) and producing an output signal when a correlation is found.

14. A correlation method as claimed in claim 13 including the additional step of testing said output signals to determine if a desired majority of said "n" tones is present and providing an output if said desired majority of output signals has been produced.

* * * * *